United States Patent
Parris et al.

(10) Patent No.: US 7,497,263 B2
(45) Date of Patent: Mar. 3, 2009

(54) METHOD AND COMPOSITION OF PREPARING POLYMERIC FRACTURING FLUIDS

(75) Inventors: Michael D. Parris, Richmond, TX (US); Ismail El Kholy, Sugar Land, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 438 days.

(21) Appl. No.: 11/285,440

(22) Filed: Nov. 22, 2005

(65) Prior Publication Data
US 2007/0114035 A1 May 24, 2007

(51) Int. Cl.
*E21B 43/26* (2006.01)
(52) U.S. Cl. .................................. 166/308.5
(58) Field of Classification Search ................ None
See application file for complete search history.

(56) References Cited

U.S. PATENT DOCUMENTS

| | | | |
|---|---|---|---|
| 3,058,909 A | 10/1962 | Kern | |
| 3,215,634 A | 11/1965 | Walker | 252/311 |
| 4,828,034 A | 5/1989 | Constien et al. | 166/308 |
| 5,046,856 A | 9/1991 | McIntire | 366/291 |
| 5,877,127 A | 3/1999 | Card et al. | 507/273 |
| 5,981,446 A | 11/1999 | Qiu | |

FOREIGN PATENT DOCUMENTS

| | | |
|---|---|---|
| EP | 0528461 | 2/1993 |
| EP | 0528461 B1 * | 10/1997 |
| EP | 0805260 | 11/1997 |
| EP | 0805260 B1 * | 6/2003 |

* cited by examiner

*Primary Examiner*—Jennifer H Gay
*Assistant Examiner*—Kerry W Leonard
(74) *Attorney, Agent, or Firm*—David Cate; Robin Nava; Dale Gaudier (57) ABSTRACT

In the presence of certain polyols, a guar gum or similar polysaccharide thickener solution is boron crosslinked before achievement of complete hydration of the thickener, without compromising the viscosity level achieved in a fracturing fluid by the time it is pumped into the wellbore and fractures the subterranean formation adjacent the wellbore. Methods continuously involve hydrating a polysaccharide thickener to an extent of 10% to 75%, but less than full hydration. Before 75% hydration is exceeded, a boron crosslinker is added. Upon addition of the boron crosslinker, the fluid is injected into the wellbore to stimulate hydrocarbon production. Because less time is needed for hydration, well site mixing equipment is down-sized smaller to achieve better efficiency and cost savings.

21 Claims, 2 Drawing Sheets

METHOD AND COMPOSITION OF PREPARING POLYMERIC FRACTURING FLUIDS

FIELD OF THE INVENTION

The present invention relates to compositions and methods for preparing polymeric fracturing fluids. In particular, the invention relates to boron crosslinked fracturing fluids for stimulating oil production.

BACKGROUND OF THE INVENTION

To enhance or increase the production of oil and gas hydrocarbons from wells bored into subterranean-formations, it has been common practice to pump a viscous fluid at high pressures down in to the well bore to crack the formation and force the fracturing fluid into those cracks. The fracturing fluid is also used to carry sand or other types of particles, called proppants, to hold the cracks open when the pressure is relieved. The cracks held open by the proppant provide additional paths for the oil or gas to reach the wellbore, which increases production from the well.

Because of the high volumes of fracturing fluids used, it is desirable to thicken the fracturing fluids with very efficient thickeners. Efficient thickeners such as guar gum are commonly used. The viscosity of solutions of guar gum and similar thickeners can be greatly enhanced by crosslinking them with boric acid or other boron containing materials. Thus, boron crosslinked guar gum solutions are useful as fracturing fluids.

Continuous processes that allow the fluids to be made in "real time" during the fracturing process have a number of advantages over a batch process of mixing water, gelling agents, or other additives into individual "frac" tanks before treatment has begun. The batch process is expensive because of the time and equipment required because of wasted and unused fluids resulting from treatment delays, termination of treatment before pumping of fluids, and fluid left in the bottom of the tanks which cannot be pumped out.

To achieve the highest amount of down whole viscosity in a boron crosslinked fracturing fluid, conventional wisdom has held that the guar gum or similar thickener should be completely hydrated prior to addition of the crosslinking agent. In general, to hydrate a polymer, the particles of polymers must first be dispersed in water so its individual particles can absorb water. The polymer's ability to absorb water dictates the hydration rate, which is affected by the temperature, the fluid, the shearing energy added during hydration, and the like. Hydration of the polymer over time is seen by an asymptotic increase of viscosity to a maximum over several minutes up to an hour or more depending on temperature, concentration, and other factors. A process for producing a boron crosslinked fracturing fluid involves continuously dispersing the polymer in water and hydrating the polymer by holding it for the required time, while applying required shear energy to reach its final linear viscosity. When full hydration is reached, the boron crosslinker is added and the fracturing fluid is pumped down the wellbore to induce fracturing in the subterranean formation.

The equipment used to continuously mix and hydrate polymers in the field consists of a mixing section where the polymer is dispersed in water and a hydration section, which is generally a multi-compartment tank of large volume designed to maintain a first in/first (FIFO) out flow pattern to allow the time required to complete hydration of the polymer before exiting the unit. To reach full hydration, the residence time in the hydration system needs to be sufficiently long to achieve a minimum viscosity before the boron crosslinker is added.

The size of the mixing equipment is dictated by the rate at which finished fluid is needed and the time to achieve proper hydration before addition of the crosslinker. For example, traditionally, where the targeted fracturing fluid delivery rate is from about 20 to about 70 barrels per minute, a typical volume of the hydration section is on the order of 250 barrels or greater. To a certain degree money can be saved by providing smaller hydration equipment if a lower pumping rate is used. Generally, this is not desirable because it reduces the efficiency of the fracturing process.

A process for continuously producing fracturing fluids in real time that could be carried out with significantly smaller equipment such as mixing units would be a significant advance in the art. Not only would such equipment be less expensive than the conventional process, but a downsized fracturing fluid production system could be used at high pumping rates even in hydrocarbon producing locations where the infrastructure does not support use of the large conventional equipment.

SUMMARY OF THE INVENTION

Methods have been discovered that allow significant reduction in the size of equipment needed to continuously produce boron crosslinked fracturing fluids at the well site. In part, the invention is based on the discovery that in the presence of certain polyols, a guar gum or similar polysaccharide thickener solution can be boron crosslinked before achievement of complete hydration of the thickener, without compromising the viscosity level achieved in the fracturing fluid by the time it is pumped into the wellbore and fractures the subterranean formation adjacent the wellbore. Continuous methods involve hydrating a polysaccharide thickener to an extent of about 10% to about 75%, but less than full hydration. Before about 75% hydration is exceeded, a boron crosslinker is added. Upon addition of the boron crosslinker, the fluid is injected into the well to stimulate oil production. Prior to crosslinking with the boron crosslinker, a polyol containing 1,2-cis-hydroxyls is added. It is believed that addition of the polyol allows the viscosity of the crosslinked system to increase during the time that the fluid is injected in the hole and before it reaches the formation. By using the process, a system designed to deliver about 70 barrels per minute of fracturing fluid can be produced that is on the order of half the size of conventional equipment. Alternatively, conventional equipment can be operated using fluids of lower temperature, saving the expense of heating a fluid to increase its hydration rate.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

The following description of, including disclosure of preferred embodiments is merely exemplary in nature and is in no way intended to limit the invention, its application, or uses.

As used herein, a pound is a US unit of weight equivalent to 454 g or 0.454 kg, while a gallon is a unit of volume equivalent to about 3.8 liters or about 3800 milliliters. A barrel contains 42 US gallons, or about 160 liters.

In one embodiment, a process for stimulating an oil well by delivering a fracturing fluid at a pumping rate into a hydrocarbon bearing subterranean formation adjacent a wellbore is provided. The method comprises continuously mixing a hydratable polymer and water at a mixing temperature, and passing the mixture through a first in/first out system sized, based on the pumping rate, the mixing temperature, and the nature of the polymer, to provide a residence time of the mixture in the system corresponding to a time needed to bring the polymer to a degree of hydration of more than 10% but less than 75%. Before the hydration degree exceeds 75%, the method involves crosslinking the polymer with a boron crosslinker. Prior to initiating of the crosslinking or simultaneously therewith a polyol comprising 1,2-cis hydroxyl groups is added to the mixture. Upon crosslinking, the fracturing fluid is injected into the oil bearing formation.

In another embodiment, a method for stimulating hydrocarbon production from a subterranean formation adjacent a wellbore comprises hydrating a polysaccharide thickener in a water solution to a hydration degree of 10% to 75% and initiating crosslinking of the polysaccharide by a boron containing crosslinker before the hydration degree exceeds 75%. Before initiating crosslinking or simultaneously herewith, a polyol that contains 1,2-cis hydroxyls is added to the polysaccharide solution. Thereafter the fracturing fluid is injected into the formation. The fracturing fluid contains crosslinked polysaccharide having a degree of hydration less than or equal to 75%, boron crosslinker, polyol, and water. The fracturing fluid optionally further comprises a proppant.

In another embodiment, a method of stimulating hydrocarbon production for a subterranean formation adjacent a wellbore comprises injecting a first fracturing fluid down a wellbore into the formation at a rate typically ranging from about 20 to about 70 barrels per minute through open cracks in the formation that allow oil to flow from the formation into the wellbore hole, followed by injecting a second fracturing fluid containing proppant at a rate of about 20 to about 70 barrels per minute into the formation. At least one of the first and second fracturing fluids comprises an aqueous solution of a hydratable polysaccharide polymer comprising 1,2-cis hydroxyls, wherein the polymer is hydrated to a degree of about 10% to about 75%, a boron crosslinker, and a polyol comprising 1,2-cis hydroxyls. While any suitable polysaccharide polymers may be used, particularly suitable hydratable polysaccharide polymers include guar gum and its derivatives. Some examples of suitable polyols include glycerol, sorbitol, gluconic acid salts, and mannitol.

The fluids of the invention are used for hydraulically fracturing a subterranean formation. Techniques for hydraulically fracturing a subterranean formation are known to persons of ordinary skill in the art, and involve pumping a fracturing fluid into the borehole and out into the surrounding formation. The fluid pressure is above the minimum in situ rock stress, thus creating or extending fractures in the formation. See Stimulation Engineering Handbook, John W. Ely, Pennwell Publishing Co., Tulsa, Okla. (1994), U.S. Pat. No. 5,551,516 (Normal et al.), "Oilfield Applications", Encyclopedia of Polymer Science and Engineering, vol. 10, pp. 328-366 (John Wiley & Sons, Inc. New York, N.Y., 1987) and references cited therein, the disclosures of which are incorporated herein by reference.

In various embodiments, hydraulic fracturing involves pumping a proppant-free viscous fluid, or pad—usually water with some fluid additives to generate high viscosity—into a well faster than the fluid can escape into the formation so that the pressure rises and the rock breaks, creating artificial fractures and/or enlarging existing fractures. Then, proppant particles are added to the fluid to form a slurry that is pumped into the fracture to prevent it from closing when the pumping pressure is released. In the fracturing treatment, fluids of the present invention are used in the pad treatment, the proppant stage, or both.

The hydratable polymer is a high molecular weight water-soluble polysaccharide containing cis-hydroxyl groups that can complex a crosslinking agent such as borate. Without limitation, useful polysaccharides for the practice of this invention have molecular weights in the range of about 200,000 to about 3,000,000.

Polysaccharides having adjacent cis-hydroxyl groups for the purposes of the invention include such polysaccharides as the galactomannans. The term galactomannans refers in various aspects to natural occurring polysaccharides derived from various endosperms of seeds. They are primarily composed of D-mannose and D-galactose units. They generally have similar physical properties, such as being soluble in water to form thick highly viscous solutions which usually can be gelled (crosslinked) by the addition of such inorganic salts as borax. Examples of some plants producing seeds containing galactomannan gums include Tara, Huizache, locust bean, Pola verde, Flame tree, guar bean plant, Honey locust, Lucerne, Kentucky coffee bean, Japanese pagoda tree, Indigo, Jenna, Rattlehox, Clover, Fenergruk seeds and soy bean hulls. The gum is provided in a convenient particulate form. Of these polysaccharides, guar and its derivatives are preferred. These include guar gum, carboxymethylguar, hydroxyethylguar, carboxymethylhydroxyethylguar, hydroxypropylguar (HPG), carboxymethylhydroxypropylguar, and combinations thereof. As a galactomannan, guar gum is a branched copolymer containing a mannose backbone with galactose branches.

Upon hydrolysis, galactomannans may yield the two simple sugars, mannose, and galactose. Analyses have indicated that such polysaccharides are long chain polymers of D-mannopyranose units linked at the β-1,4 position which have D-galactopyranose units located as side chains on the molecule. The D-galactopyranose units are connected to the $C_6$ atoms of the D-mannose units that make up the main structural framework. The ratio of D-galactose to D-mannose in the galactomannans generally varies from about 1:1.2 to about 1:2, depending upon the particular vegetable source from which the material is derived. In all cases, however, the mannose residues have cis-hydroxyl groups at the $C_2$ and $C_3$ positions, accounting for the crosslinking reactions obtained with the galactomannans and making them useful for the purposes of the invention. As noted, guar gum is a particularly preferred galactomannan.

In various embodiments, the boron crosslinkers are water soluble compounds that yield borate ions in solution. Suitable boron crosslinking agents include boric acid, calcium metaborate, sodium metaborate, potassium metaborate, potassium tetraborate, sodium tetraborate, sodium metaborate tetrahydrate, sodium tetraborate decahydrate, and the like. Sodium tetraborate decahydrate is marketed commercially as Borax®. In various embodiments, boric acid is preferred because of its ready availability, low cost, and effectiveness in low concentrations.

The boron crosslinking agent is capable of yielding borate ions in an alkaline solution. Sparingly soluble borates, such as alkaline earth metal borates, alkali metal alkaline earth borates, and combinations thereof are further examples of suitable borate sources. Among sparingly soluble borates that produce borate ion in an alkaline solution are minerals such as Probertite, Ulexite, Nobleite, Gowerite, Frolovite, Colemanite, Meyerhofferite, Inyoite, Priceite, Tertschite, Ginorite, Pinnoite, Paternoite, Kurnakovite, Inderite, Preobazhenskite, Hydroboracite, Inderborite, Kaliborite (Heintzite), and Vealchite.

To activate boron crosslinking, the pH of the fracturing fluid is adjusted to or maintained at a value of at least about 8.0, preferably at least about 8.5, and more preferably between about 9.5 and 12. In various embodiments, a pH control agent such as a hydroxyl ion releasing material and/or preferably a buffering agent is employed to achieve a suitable pH.

Non-limiting examples of hydroxyl ion releasing agent include any soluble or partially soluble hydroxide or carbonate that provides the desirable pH value in the fracturing fluid to promote borate ion formation and crosslinking with the polysaccharide and polyol. The alkali metal hydroxides, e.g., sodium hydroxide, and carbonates are preferred. Other acceptable materials are $Ca(OH)_2$, $Mg(OH)_2$, $Bi(OH)_3$, $Co(OH)_2$, $Pb(OH)_2$, $Ni(OH)_2$, $Ba(OH)_2$ and $Sr(OH)_2$. At temperatures above about 175° F., potassium fluoride (KF) is used to prevent the precipitation of MgO when $Mg(OH)_2$ is used as a base, i.e., hydroxyl ion releasing agent. The amount of the hydroxyl ion source to provide is that which is sufficient to yield a pH value in the fracturing fluid of at least about 8.0, preferably at least 8.5, preferably at least about 9.5, and more preferably between about 9.5 and about 12.

A buffering agent is preferably employed in the practice of the present invention, to buffer the fracturing fluid, i.e., moderate amounts of either a strong base or acid may be added without causing any large change in pH value of the fracturing fluid. In various embodiments, the buffering agent is a combination of a weak acid and a salt of the weak acid; an acid salt with a normal salt; or two acid salts. Examples of suitable buffering agents are $NaH_2PO_4$—$Na_2HPO_4$; sodium carbonate-sodium bicarbonate; and sodium bicarbonate, or other like agents. By employing a buffering agent instead of merely a hydroxyl ion producing material, a fracturing fluid is provided which is more stable to a wide range of pH values found in local water supplies and to the influence of acidic materials located in formations and the like. In an exemplary embodiment, the pH control agent is varied between about 0.6 percent and about 40 percent by weight of the polysaccharide employed.

As used in this specification, the term "polyol" means an organic compound having adjacent hydroxyl groups in a cis-orientation, i.e., cis-hydroxyls. For convenience, they are referred to as 1,2-cis hydroxyls to indicate not that the hydroxyls are necessarily on the number 1 and 2 carbon atoms, but that the hydroxyls are on adjacent carbons. Non-limiting examples include propylene glycol, butylene glycol, glycerol, and polyols of 6 or more carbon atoms. Thus, non-limiting polyols include such materials as saccharides, including monosaccharides, disaccharides, and oligosaccharides having a molecular weight up to about 2,000. Also included in the term "polyol" are the acid, acid salt, ester, hydrogenation and amine derivatives of the polyol so long as the polyol has and continues to have at least one set of adjacent cis-hydroxyl groups. For example, glucose is a monosaccharide. Monosaccharides are any of several simple sugars having the formula $C_6H_{12}O_6$. Gluconic acid is the acid derivative of glucose. A gluconate, for example sodium gluconate, is the acid salt of gluconic acid. Accordingly, a gluconate is the acid salt derivative of a saccharide. Mannitol and sorbitol are both hexahydric alcohols with one hydroxyl group per carbon atom. Mannitol is derived by hydrogenating glucose, i.e., by hydrogenating the —CH=O group of glucose to the —CH2-OH of mannitol. Sorbitol has the same number of carbons, hydrogen and oxygen as mannitol. One of the —OH's is arranged in the opposite direction from that of mannitol. Sorbitol is derived by pressure hydrogenation of dextrose (another name for glucose) with nickel catalysts. Accordingly, mannitol and sorbitol are both hydrogenation derivatives of glucose which is a monosaccharide or, generically, a saccharide.

In various embodiments, the polyols contain 6 or more carbon atoms. Non-limiting examples of polyols include fructose, sorbitol, gluconic acid, and salts thereof, such as sodium gluconate, glucoheptonic acid and salts thereof such as sodium glucoheptonate, mannitol, ribose, arabinose, and xylose. In various embodiments, preferred polyols include sorbitol, mannitol, and gluconic acid salts such as sodium gluconate.

A first in/first out (FIFO) system refers to a mixing or reaction vessel (or unit) or series of vessels (units) that tend to simulate first in/first out behavior thus maximizing the effects of residence time per unit volume of tank at any given flow. In the limit of perfect first in/first out behavior, all material entering the system at a time t1 exits at a later time t2 and the residence time of all the material in the system is the same, being a time t2-t1. The term "plug flow" is sometimes used to describe the idealized behavior, but the first in/first out systems used in the invention are not limited to plug flow conditions. Rather, the FIFO systems simulate plug flow systems, and approach plug flow as an ideal.

A simple first in/first out system is illustrated by a mixing tank where the components to be mixed are introduced at the bottom of the tank and the solution of components is withdrawn at the top. On average, the material exiting at the top of the tank has spent a longer time in the tank (residence time) than material being added at the bottom, but it is understood that the first in/first out characteristics of the system are far from the ideal plug flow. The theoretical plug flow behavior of such simple systems is improved by the addition of baffles and the like in the mixing tank.

Further examples of first in/first out systems include those in which a hydratable polymer is mixed with water at the beginning of a series of tanks and passes through a series of vertical flow tanks. The vertical flow tanks provide for a residence time suitable to hydrate the aqueous mixture. Such a system is described in U.S. Pat. No. 4,828,034, the disclosure of which is hereby incorporated by reference. The system may also provide for pumping the system through a centrifugal pump at some point along the series of vertical flow tanks. The vertical flow tanks include a series of underflow and overflow tanks wherein the primary flow through the tank is in the vertical direction, up or down.

The use of a series of vertical flow tanks for hydration of the hydratable polymer is based on the assumption that the fluid flows through the series of tanks in a first in/first out manner approximating plug flow. If the fluid is in turbulent flow in the vertical tanks, plug flow is more closely achieved since turbulent eddies moving through the tanks prevent channeling of fluid and bypassing of large volumes of fluids in the tanks.

On the other hand, fully developed laminar flow in vertical flow tanks would also exhibit a nearly ideal plug flow character. However, laminar flow through a series of such flow tanks is normally dominated by entrance effects. As a result of the entrance effects, the theoretical parabolic fluid velocity profiles do not develop and the large portions of the tanks volume are bypassed as the fluid channels through with reduced residence time.

Channeling effects in first in/first out systems can be mitigated by providing impellers or other means for mixing the solutions in the vertical tanks. For example, in U.S. Pat. No. 5,046,856, the disclosure of which is hereby incorporated by reference, a first in/first out mixing apparatus is shown comprising a series of tanks representing a series flow path through the mixing apparatus. Each of the tanks has a vertical axis that alternates from downward to upward in adjacent tanks. For example, fluid entering a first tank flows axially downwardly through the tank and under a separator wall into an adjacent tank. In the adjacent tank an impeller means provides for upward axial flow of the fluid in the tank to pass over a separator wier into the next tank in the series. The process is repeated in adjacent tanks to provide serial flow through the system. An average residence time in the first in/first out system is calculated by conventional means.

The residence time in a first in/first out system is determined by the flow rate and the size of the system. For polymer hydration, the required residence time determines the size of the hydration tanks given a desired flow rate. Common fracturing fluid delivery rates (flow rates) range from about 20 to about 70 barrels per minute. For a water temperature of 72° F., a hydration time of about 3.5 minutes is typically needed to achieve at least 85% hydration, which is regarded as the acceptable industry standard for hydration percentage at the exit of continuous hydration units/mixing units (as used herein, the terms hydration unit and mixing unit are used interchangeably, and are generally considered the same equipment used for the same purpose). From the residence time and the flow rate a calculated hydration tank size of 70×3.5=245 barrels is obtained, which is the typical volume used on such units. Thus, a system sized for a flow rate of 70 barrels per minute and 85% hydration would require a total volume of 245 barrels. Systems sized for hydration degrees less than 85%; such as between 10% and 75%, would contain proportionally fewer barrels of volume.

Figure 1:
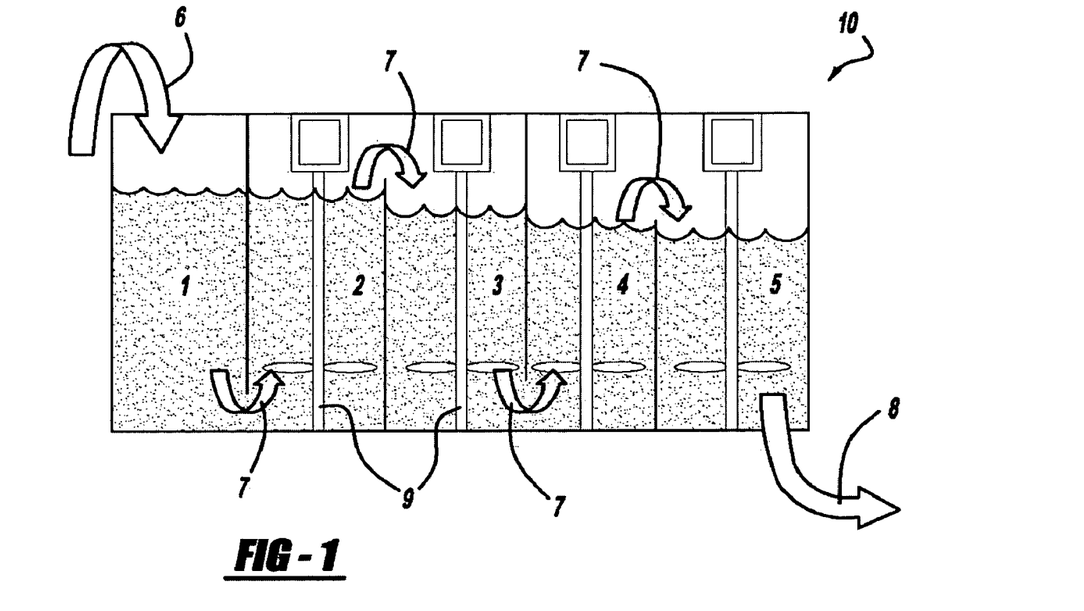
FIG. 1 is a diagram of a first in/first out system.

The equipment used to continuously mix and hydrate polymer gel in the field contains a mixing section where the polymer is dispersed in water and a hydration section, which is generally a multi-compartment tank of large volume designed to provide a first in/first out flow pattern with sufficient residence time to accomplish the desired degree of hydration of the polymer before exiting the unit. Agitation is preferably applied in the hydration tank to improve the rate of hydration and maintain the first in/first out flow pattern by reducing channeling. FIG. 1 illustrates the flow path of a fluid in a typical multi-compartment first in/first out flow hydration tank 10. Mixed gel enters at the top of mixing compartment 1, indicated by the arrow 6. Alternatively, powder polymer is added to water in the mixing compartment. The mixture then proceeds through a series of hydration compartments 2, 3, 4 and 5 along a flow path 7, and exits at the bottom of compartment 5, indicated by the arrow 8. The hydration tank 10 is sized for the flow rate of mixed gel coming into tank 1 and removed from tank 5, taking into consideration the residence time required for the desired hydration degree as well as the temperature of the fluid. Upon exit from the hydration tank 10, the hydrated gel is crosslinked with a boron containing crosslinking agent and injected down a wellbore to reach, after a time to perforation, the subterranean formation to be stimulated. If desired, proppant is added before wellbore injection.

The fracturing fluid injected down the wellbore hole contains water, water soluble polymer hydrated to a degree of from about 10% to about 75%, a boron crosslinking agent that provides a source of borate ion in alkaline pH, and an effective amount of a polyol as described above. First, a water solution of the polymer is provided in the mixing compartment of a mixing unit. Normally the pH is held below approximately 8 to enhance the hydration rate of the polymer. At this point, the solution optionally contains a boron crosslinking agent, but if so, crosslinking by borate ion may be prevented or minimized by keeping the pH low (i.e. below about 8). When the polymer solution exits the hydration tank of the mixing unit, having a hydration degree of between about 10% and about 75%, crosslinking is induced. In various embodiments, crosslinking is induced by adding a boron containing crosslinking agent along with a pH control agent to increase the pH above 8 and preferably from about 9 to about 12. Alternatively, if the polymer solution in the mixing tank contains the crosslinking agent, crosslinking is induced after hydration by addition of a pH control agent to raise the pH to a suitable level. The polyol is added to the system at any time, as long as it is present in the solution by the time of activation of the boron crosslinking. That is, in various embodiments, the polyol is added before initiation or simultaneous with initiation.

Using a plurality of mixing units, in a parallel configuration for example, may be effective in increasing the delivery rate of the fluid. For example, to provide a delivery rate of up to about 140 barrels per minute, two mixing units in parallel may be used. Further, using three units may provide a delivery rate of up to about 200 barrels per minute.

Non-limiting examples of typical concentrations used in oil well stimulation are as follows. Polymer is provided at levels of about 10-60 pounds/1000 gallons of water (about 0.12-0.72% by wt.). For such concentrations of guar gum, e.g. 10-60 pounds/1000 gal, it has been found that the hydration rate is independent of the concentration. Use of lower levels tends to lead to development of insufficient viscosity, while higher concentrations tend to waste material. Where those disadvantages are avoided, higher and lower concentrations are useful. The boron crosslinker is provided in a level of about 20-200 ppm, based on elemental boron. The ranges are not absolute, but give a general guidance. Below a boron level of 20 ppm, there is a risk that viscosity does not develop to a desirable extent, while above about 200 ppm boron, normally no additional effect is observed, which could lead to waste of material. The polyol is preferably provided at about 0.01 to about 0.18% by weight, depending to a certain extent on the molecular weight of the polyol. For polyols of 3 to 6 carbon atoms, typical treatments are from about 1 to about 15 pounds per 1000 gallons (about 0.01% to about 0.18% by weight).

In various embodiments, the polymer is sifted into a water solution or added to water as an emulsion in a carrier fluid such as a petroleum oil. In various embodiments, the boron crosslinking agent is also provided in the polymer stream as a mixture of dry ingredients or as part of the petroleum oil emulsion. As noted, when the boron containing crosslinking agents are part of the hydrating mixture, crosslinking is activated after hydration by raising the pH.

The hydratable polymer is in general stable in the presence of dissolved salts. Accordingly, ordinary tap water, brines, and the like can be used to prepare the polymer solution.

Hydration of the polymer is carried out in a first in/first out system for a time necessary to achieve about 75% or less degree of hydration. In various embodiments, the degree of hydration to be achieved is from about 10% to about 75%, from about 10% to about 60%, from about 20 to about 75%, from about 20% to about 60%, from about 30% to about 75%, from about 30% to about 60%, from about 40% to about 75%, from about 40% to about 60%, or even from about 40% to about 50% degree of hydration. Percent hydration is measured and determined as development of a percentage of the viscosity that the polymer would achieve under full hydration. To illustrate, if the maximum viscosity reached at full hydration is 22 centipoise at a certain temperature and shear rate, then 50% hydration is achieved when the viscosity reaches 11 centipoise at the same temperature and shear rate. Here, one centipoise is equivalent to one millipascal second (mPa·s). Similarly, 10% hydration achieves 2.2 centipoise, 20% hydration achieves 4.4 centipoise, and so on. For a given polymer system at a given temperature in a given mixing system, the time to full hydration can be readily determined experimentally or empirically. From the time to full hydration, the time to partial hydration degrees such as 75% and less can likewise be determined. Finally, from the time to partial hydration, the size of the mixing tanks is determined based on the residence calculated from the desired flow rate. The system is said to be sized to achieve a residence time needed to achieve a hydration degree of about 10% to about 75%, etc. Naturally, all result effective variables are taken into consideration when sizing the tanks. These include without limitation flow rate, degree of shear, temperature, nature of the polymer thickener, and so on.

At a point after hydration begins, crosslinking is induced, optionally proppant is added, and the resulting fracturing fluid injected into a wellbore hole to stimulate the formation. Normally, there is a time of several minutes before the fluid pumped into the wellbore reaches the formation. During this time, the incompletely hydrated polymer continues to develop a fully crosslinked viscosity, despite having been crosslinked at less than full hydration. In one aspect, advantages of the invention lie in the result that hydration time is shortened and the size of the mixing equipment is concomitantly reduced.

Figure 2:
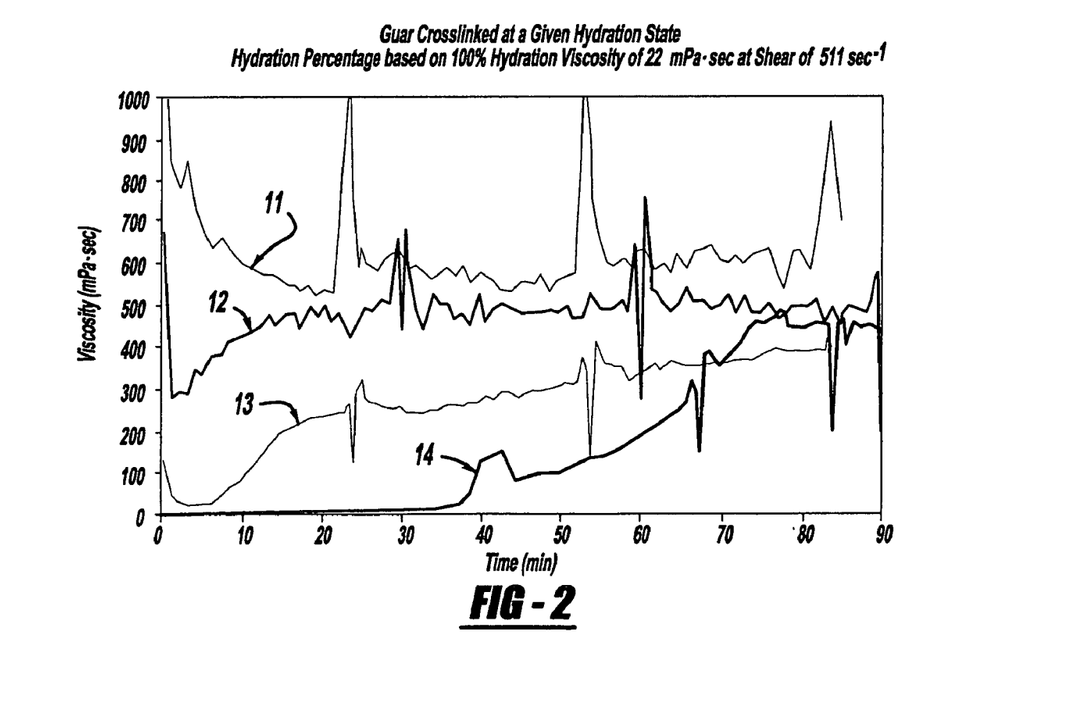
FIG. 2 is a graph of viscosity development against time for systems of varying hydration levels.

The effect of crosslinking guar solutions at a given hydration state is illustrated in FIG. 2. The graph shows the development of viscosity of a boron crosslinked guar system, wherein the boron crosslinking is initiated at 10% hydration (curve 14), 30% hydration (curve 13), 50% hydration (curve 12), and 100% hydration (curve 11). The solutions contain 30 pounds guar gum per 1000 gallons (0.36% wt), 7.2 pounds glycerol(polyol) per 1000 gallons (0.09% wt), and 60 ppm boron from borax (sodium tetraborate decahydrate), measured as elemental boron.

For the experiment of FIG. 2, the hydration percentage is based on a 30 minute hydration viscosity, which is taken as 100% hydration. That is, after 30 minutes of hydration, the viscosity of the guar solution reaches a value of 22 cP measured for example at 25° C. on a Fann 35 viscometer at 511 sec$^{-1}$ using rotor #1 and bob #1. On that basis, 50% hydration is deemed to occur when the viscosity reaches one half of the 100% hydration level, measured at the same shear rate. Similarly, the 30% hydration degree is deemed to have occurred when the viscosity reaches 30% of that of the 100% hydration experiment. Illustratively, the 10% hydration is deemed as occurring when the hydrating guar solution reaches a viscosity level of 10% of that achieved at the 100% state. FIG. 2 shows that even when crosslinked at 10% hydration in the presence of a polyol, the viscosity of the hydrated polymer continues to increase until it reaches a value approximating that of the system crosslinked at 100% hydration. A similar observation is made for curves 12 and 13 produced by crosslinking at 50% and 30%, respectively. In both cases, the viscosity of the crosslinked system continues to increase from an initially low viscosity. To a first approximation, the viscosities ultimately achieved, as shown in FIG. 2, are the same, whether the system was crosslinked at 10%, 30%, 50% or 100% hydration. The peaks and apparent spikes in curves 11, 12, 13, and 14 are experimental artifacts (where the viscosity is measured at lower shear rates).

In various embodiments, the invention provides for hydration of guar or other polymers at temperatures ranging from just above freezing (about 1° C.) to about 35° C. or higher. Generally, hydration is faster the higher the temperature is. On the other hand, mixing at low temperatures saves the energy costs and time of heating the fluid; such is particular advantageous when operating in cold climates or in temperate climates on cold days. Whatever the temperature, the time needed to hydrate the polymer thickener prior to initiating of crosslinking is reduced by the use of the polyols described herein. Thus, in some embodiments, the invention enables one to operate at lower temperatures for the same amount of time as before, or alternatively at higher temperatures for a considerable shorter time, since it is now recognized for the first time that full hydration need not be reached at the well site before the fracturing fluid is injected down the wellbore. Advantageously, the temperature of the fluid of the method is from about 1 to about 50° C., from about 1 to about 35° C., from about 1 to about 25° C., from about 1 to about 20° C., or even from about 1 to about 10° C. In a preferred embodiment, the fluid temperature is from about 1 to about 5° C., saving time and energy needed to heat the fluid to achieve suitable viscosity before crosslinking.

Some fluids according to the invention may also include a surfactant. Any surfactant for which its ability to aid the dispersion and/or stabilization of the gas component into the base fluid to form an energized fluid is readily apparent to those skilled in the art may be used. Viscoelastic surfactants, such as those described in U.S. Pat. No. 6,703,352 (Dahayanake et al.) and U.S. Pat. No. 6,482,866 (Dahayanake et al.), both incorporated herein by reference, are also suitable for use in fluids of the invention. In some embodiments of the invention, the surfactant is an ionic surfactant. Examples of suitable ionic surfactants include, but are not limited to, anionic surfactants such as alkyl carboxylates, alkyl ether carboxylates, alkyl sulfates, alkyl ether sulfates, alkyl sulfonates, $\alpha$-olefin sulfonates, alkyl ether sulfates, alkyl phosphates and alkyl ether phosphates. Examples of suitable ionic surfactants also include, but are not limited to, cationic surfactants such as alkyl amines, alkyl diamines, alkyl ether amines, alkyl quaternary ammonium, dialkyl quaternary ammonium and ester quaternary ammonium compounds. Examples of suitable ionic surfactants also include, but are not limited to, surfactants that are usually regarded as zwitterionic surfactants and in some cases as amphoteric surfactants such as alkyl betaines, alkyl amido betaines, alkyl imidazolines, alkyl amine oxides and alkyl quaternary ammonium carboxylates. The amphoteric surfactant is a class of surfactant that has both a positively charged moiety and a negatively charged moiety over a certain pH range (e.g. typically slightly acidic), only a negatively charged moiety over a certain pH range (e.g. typically slightly alkaline) and only a positively charged moiety at a different pH range (e.g. typically moderately acidic), while a zwitterionic surfactant has a permanently positively charged moiety in the molecule regardless of pH and a negatively charged moiety at alkaline pH. In some embodiments of the invention, the surfactant is a cationic, zwitterionic or amphoteric surfactant containing and amine group or a quaternary ammonium group in its chemical structure ("amine functional surfactant"). A particularly useful surfactant is the amphoteric alkyl amine contained in the surfactant solution Aquat 944® (available from Baker Petrolite of 12645 W. Airport Blvd, Sugar Land, Tex. 77478 USA). In other embodiments of the invention, the surfactant is a blend of two or more of the surfactants described above, or a blend of any of the surfactant or surfactants described above with one or more nonionic surfactants. Examples of suitable nonionic surfactants include, but are not limited to, alkyl alcohol ethoxylates, alkyl phenol ethoxylates, alkyl acid ethoxylates, alkyl amine ethoxylates, sorbitan alkanoates and ethoxylated sorbitan alkanoates. Any effective amount of surfactant or blend of surfactants may be used in aqueous energized fluids of the invention. Preferably the fluids incorporate the surfactant or blend of surfactants in an amount of about 0.02 wt % to about 5 wt % of total liquid phase weight, and more preferably from about 0.05 wt % to about 2 wt % of total liquid phase weight.

Friction reducers may also be incorporated into fluids of the invention. Any friction reducer may be used. Also, polymers such as polyacrylamide, polyisobutyl methacrylate, polymethyl methacrylate and polyisobutylene as well as water-soluble friction reducers such as guar gum, guar gum derivatives, polyacrylamide, and polyethylene oxide may be used. Commercial drag reducing chemicals such as those sold by Conoco Inc. under the trademark "CDR" as described in U.S. Pat. No. 3,692,676 (Culter et al.) or drag reducers such as those sold by Chemlink designated under the trademarks "FLO 1003, 1004, 1005 & 1008" have also been found to be effective. These polymeric species added as friction reducers or viscosity index improvers may also act as excellent fluid loss additives reducing or even eliminating the need for conventional fluid loss additives.

Fluids based on the invention may also comprise a breaker. The purpose of this component is to "break" or diminish the viscosity of the fluid so that this fluid is more easily recovered from the formation during cleanup. With regard to breaking down viscosity, oxidizers, enzymes, or acids may be used. Breakers reduce the polymer's molecular weight by the action of an acid, an oxidizer, an enzyme, or some combination of these on the polymer itself. In the case of borate-crosslinked gels, increasing the pH and therefore increasing the effective concentration of the active crosslinker, the borate anion, reversibly create the borate crosslinks. Lowering the pH can just as easily eliminate the borate/polymer bonds. At a high pH above 8, the borate ion exists and is available to crosslink and cause gelling. At lower pH, the borate is tied up by hydrogen and is not available for crosslinking, thus gelation caused by borate ion is reversible.

Embodiments of the invention may also include proppant particles that are substantially insoluble in the fluids of the formation. Proppant particles carried by the treatment fluid remain in the fracture created, thus propping open the fracture when the fracturing pressure is released and the well is put into production. Suitable proppant materials include, but are not limited to, sand, walnut shells, sintered bauxite, glass beads, ceramic materials, naturally occurring materials, or similar materials. Mixtures of proppants can be used as well. If sand is used, it will typically be from about 20 to about 100 U.S. Standard Mesh in size. With synthetic proppants, mesh sizes about 8 or greater may be used. Naturally occurring materials may be underived and/or unprocessed naturally occurring materials, as well as materials based on naturally occurring materials that have been processed and/or derived. Suitable examples of naturally occurring particulate materials for use as proppants include, but are not necessarily limited to: ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc. including such woods that have been processed by grinding, chipping, or other form of particalization, processing, etc. Further information on nuts and composition thereof may be found in Encyclopedia of Chemical Technology, Edited by Raymond E. Kirk and Donald F. Othmer, Third Edition, John Wiley & Sons, Volume 16, pages 248-273 (entitled "Nuts"), Copyright 1981, which is incorporated herein by reference.

The concentration of proppant in the fluid can be any concentration known in the art, and will preferably be in the range of from about 0.03 to about 3 kilograms of proppant added per liter of liquid phase. Also, any of the proppant particles can further be coated with a resin to potentially improve the strength, clustering ability, and flow back properties of the proppant.

The aqueous medium of the present invention may be water or brine. In those embodiments of the invention where the aqueous medium is a brine, the brine is water comprising an inorganic salt or organic salt. Preferred inorganic salts include alkali metal halides, more preferably potassium chloride. The carrier brine phase may also comprise an organic salt more preferably sodium or potassium formate. Preferred inorganic divalent salts include calcium halides, more preferably calcium chloride or calcium bromide. Sodium bromide, potassium bromide, or cesium bromide may also be used. The salt is chosen for compatibility reasons i.e. where the reservoir drilling fluid used a particular brine phase and the completion/clean up fluid brine phase is chosen to have the same brine phase.

A fiber component may be included in the fluids of the invention to achieve a variety of properties including improving particle suspension, and particle transport capabilities, and gas phase stability. Fibers used may be hydrophilic or hydrophobic in nature, but hydrophilic fibers are preferred. Fibers can be any fibrous material, such as, but not necessarily limited to, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON® polyethylene terephthalate (PET) Fibers available from Invista Corp. Wichita, Kans., USA, 67220. Other examples of useful fibers include, but are not limited to, polylactic acid polyester fibers, polyglycolic acid polyester fibers, polyvinyl alcohol fibers, and the like. When used in fluids of the invention, the fiber component may be include at concentrations from about 1 to about 15 grams per liter of the liquid phase of the fluid, preferably the concentration of fibers are from about 2 to about 12 grams per liter of liquid, and more preferably from about 2 to about 10 grams per liter of liquid Fluid embodiments of the invention may further contain other additives and chemicals that are known to be commonly used in oilfield applications by those skilled in the art. These include, but are not necessarily limited to, materials such as surfactants in addition to those mentioned hereinabove, breaker aids in addition to those mentioned hereinabove, oxygen scavengers, alcohols, scale inhibitors, corrosion inhibitors, fluid-loss additives, bactericides, and the like. Also, they may include a co-surfactant to optimize viscosity or to minimize the formation of stable emulsions that contain components of crude oil or a polysaccharide or chemically modified polysaccharide, polymers such as cellulose, derivatized cellulose, guar gum, derivatized guar gum, xanthan gum, or synthetic polymers such as polyacrylamides and polyacrylamide copolymers, oxidizers such as ammonium persulfate and sodium bromate, and biocides such as 2,2-dibromo-3-nitrilopropionamine.

Aqueous fluid embodiments of the invention may also comprise an organoamino compound. Examples of suitable organoamino compounds include, but are not necessarily limited to, tetraethylenepentamine, triethylenetetramine, pentaethylenehexamine, triethanolamine, and the like, or any mixtures thereof. When organoamino compounds are used in fluids of the invention, they are incorporated at an amount from about 0.01 wt % to about 2.0 wt % based on total liquid phase weight. Preferably, when used, the organoamino compound is incorporated at an amount from about 0.05 wt % to about 1.0 wt % based on total liquid phase weight. A particularly useful organoamino compound is tetraethylenepentamine.

The following examples are presented to illustrate the preparation and properties of aqueous viscoelastic nanotube fluids and should not be construed to limit the scope of the invention, unless otherwise expressly indicated in the appended claims. All percentages, concentrations, ratios, parts, etc. are by weight unless otherwise noted or apparent from the context of their use.

EXAMPLES

Example 1

Figure 3:
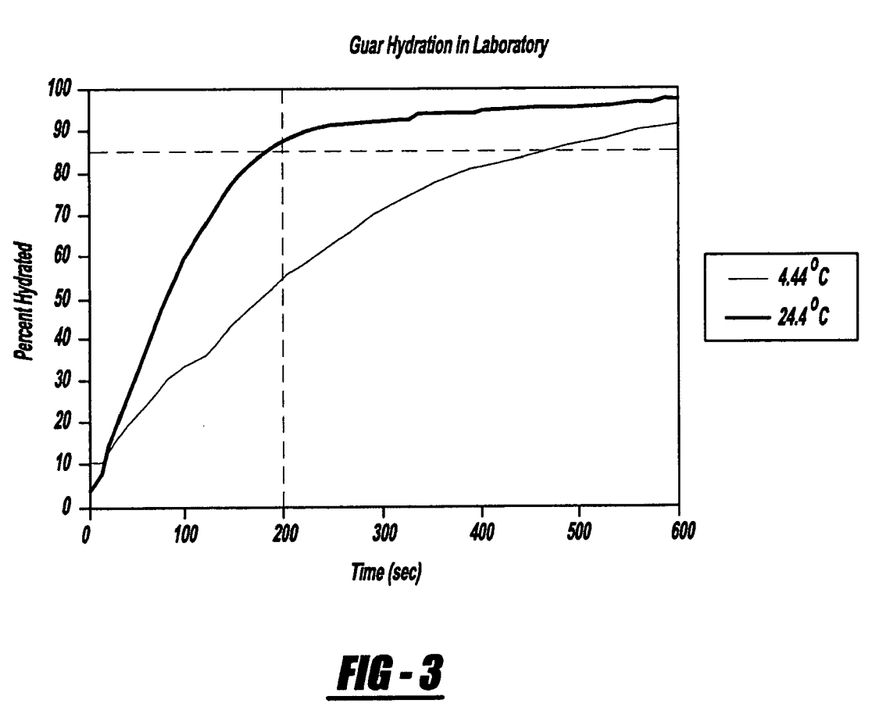
FIG. 3 is a graph of laboratory results of percent hydration against time at two temperatures.

From a laboratory study, shown for illustration in FIG. 3, it is determined that it takes 190 seconds to reach 85% hydration at 76° for a solution of guar gum in water. The solution contains 30 pounds guar gum per 1000 gallons and is about 0.36% wt of guar gum. A level of 85% hydration is achieved when the viscosity reaches 18.5 cP (18.5 mPa·sec), measured at a shear rate of 511 sec$^{-1}$. The same curve shows that 50% is attained in only 80 seconds. A first in/first out system sized for 50% hydration is one that achieves a residence time of 80 seconds. A hydratable polymer is mixed in a first in/first out system sized to 50% hydration, achieving a residence time of 80 seconds. After hydration to 50%, boron crosslinking is activated. Immediately after activation of crosslinking the fluid is pumped down a wellbore where it reaches its final crosslinked viscosity before reaching the perforations. Because the time to 50% hydration is less than half of the time to 85% hydration, the hydration tank volume is reduced by more than half, still maintaining the same fluid flow and producing a fluid that attains the final crosslinked viscosity prior to reaching the perforations. Accordingly, the unit volume of the mixing equipment is less than half of that used with a system at 85% hydration.

Example 2

Referring again to FIG. 3, at 200 seconds, which is the residence time of a typical 250 barrel unit at a flow rate of 70 barrels per minute, the polymer achieves a hydration degree of 87% at a temperature of 76° F. (24.4° C.). At 40° F. (4.44° C.), a degree of hydration of 56% is achieved. At the well site, a solution of guar gum and water (0.36% by weight of guar gum in water) is mixed at 40° F. (4.44° C.) and passed through a first in/first out system sized at 250 barrels. Upon exit from the mixing unit, the polymer is 56% hydrated. Boron crosslinking is then activated and the crosslinked fracturing fluid injected down the wellbore. Even though the fluid is crosslinked when it is only 56% hydrated, full crosslinked viscosity continues to develop during the time the fluid is injected into the wellbore and before it reaches the perforations. The time and expense of heating the water above 4° C. is avoided.

Although various embodiments have been described with respect to enabling disclosures, it is to be understood the invention is not limited to the disclosed embodiments. Variations and modifications that would occur to one of skill in the art upon reading the specification are also within the scope of the invention, which is defined in the appended claims.

We claim:

1. A process for stimulating a subterranean formation adjacent a wellbore by delivering a fracturing fluid at a pumping rate into the formation, the method comprising:
   continuously mixing a hydratable polymer and water at a mixing temperature;
   passing the mixture through a first in/first out system sized, based on the pumping rate, the mixing temperature, and the nature of the polymer, to provide a residence time of the mixture in the system corresponding to a time needed to bring the polymer to a degree of hydration of more than about 10% but less than about 75%;
   initiating crosslinking of the polymer with a boron crosslinker before the hydration degree exceeds about 75%;
   prior to or simultaneous with initiation of crosslinking, adding a polyol comprising 1,2-cis hydroxyl groups to the polymer/water mixture; and
   injecting the fracturing fluid comprising polymer, crosslinker, polyol, and water, into the formation, at a delivery rate of from about 20 to about 70 barrels per minute.

2. A process according to claim 1, wherein the system is sized to provide a residence time corresponding to a time needed to bring the mixture to a hydration degree of from about 10% to about 60%.

3. A process according to claim 1, wherein the system is sized to provide a residence time corresponding to a time needed to bring the mixture to a hydration degree of from about 30% to about 60%.

4. A process according to claim 1, wherein the system is sized to provide a residence time corresponding to a time needed to bring the mixture to a hydration degree of from about 40% to about 60%.

5. A method according to claim 1, wherein the polyol is selected from the group consisting of glycerol, sorbitol, gluconic acid or salt thereof, and mannitol.

6. A method according to claim 1, wherein the first in/first out system is sized to deliver about 70 barrels per minute.

7. A method according to claim 6, wherein the system has a volume of about 150 barrels or less.

8. A method according to claim 1, wherein the system is sized to deliver 70 barrels per minute at about 20° C.

9. A method according to claim 8, wherein the system has a volume of less than about 150 barrels.

10. A method according of claim 1, wherein crosslinking comprises adding a boron crosslinker under basic conditions to the mixture of hydratable polymer and water.

11. A method according to claim 1, wherein initiating crosslinking comprises increasing the pH of a solution containing hydratable polymer and a boron crosslinker to above about 8.0.

12. A method according to claim 1, wherein the fracturing fluid further comprises a proppant.

13. A method for stimulating hydrocarbon production from a subterranean formation, comprising:

hydrating a polysaccharide thickener in water solution to a hydration degree of about 10% to about 75%;

initiating crosslinking of the polysaccharide by a boron-containing crosslinker before the hydration degree exceeds 75%;

before or simultaneous with initiating crosslinking, adding a polyol comprising 1,2-cis hydroxyls; and injecting a fracturing fluid comprising the crosslinked polysaccharide having a degree of hydration less than or equal to 75%, crosslinker, polyol, and water into the subterranean formation.

14. A method according to claim 13, wherein the fracturing fluid comprises proppant.

15. A method according to claim 13, wherein the polyol contains six or more carbon atoms.

16. A method according to claim 13, wherein the polyol comprises mannitol.

17. A method according to claim 13, wherein the polyol comprises sorbitol.

18. A method according to claim 13, wherein the polyol comprises sodium gluconate.

19. A method according to claim 13, comprising hydrating the polysaccharide thickener to a hydration degree of 20% to 60% and initiating crosslinking by the boron containing crosslinker before the hydration degree reaches 60%.

20. A method according to claim 13, comprising hydrating the polysaccharide thickener to hydration degree of from 20 to 60% and initiating crosslinking when the hydration degree is in the range of 40 to 60%.

21. A process for stimulating a subterranean formation adjacent a wellbore by delivering a fracturing fluid at a delivery rate into the formation, the method comprising:

continuously mixing a hydratable polymer and water at a mixing temperature in a plurality of mixing units, each having a volume of less than about 150 barrels;

passing the mixture through a first in/first out system sized of each mixing unit, based on the pumping rate, the mixing temperature, and the nature of the polymer, to provide a residence time of the mixture in the system corresponding to a time needed to bring the polymer to a degree of hydration of more than about 10% but less than about 75%;

initiating crosslinking of the polymer with a boron crosslinker before the hydration degree exceeds about 75%;

prior to or simultaneous with initiation of crosslinking, adding a polyol comprising 1,2-cis hydroxyl groups to the polymer/water mixture; and injecting the fracturing fluid comprising polymer, crosslinker, polyol, and water, into the formation at a delivery rate of from about 40 to about 140 barrels per minute;

wherein the viscosity of the fracturing fluid has a first value upon injection and increases to a second value while it is in the wellbore for the time to perforation, wherein the second value is at least five times that of the first value.

* * * * *